United States Patent
Li et al.

(10) Patent No.: US 10,264,538 B2
(45) Date of Patent: Apr. 16, 2019

(54) LISTEN-BEFORE-TALK MECHANISM

(71) Applicant: QUALCOMM Incorporated, San Diego, CA (US)

(72) Inventors: Chong Li, Jersey City, NJ (US); Lei Zhang, New Brunswick, NJ (US); Xinzhou Wu, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 14/857,588

(22) Filed: Sep. 17, 2015

(65) Prior Publication Data

US 2017/0086152 A1    Mar. 23, 2017

(51) Int. Cl.
*H04L 5/00*    (2006.01)
*H04W 16/14*    (2009.01)
*H04W 56/00*    (2009.01)
*H04W 72/04*    (2009.01)
*H04W 74/08*    (2009.01)
*H04W 84/12*    (2009.01)

(52) U.S. Cl.
CPC ......... *H04W 56/001* (2013.01); *H04L 5/0048* (2013.01); *H04W 16/14* (2013.01); *H04W 72/0446* (2013.01); *H04W 74/0808* (2013.01); *H04W 74/0816* (2013.01); *H04W 84/12* (2013.01)

(58) Field of Classification Search
CPC ........... H04W 56/001; H04W 74/0808; H04W 16/14; H04W 72/0446; H04W 74/0816; H04W 84/12; H04L 5/0048
See application file for complete search history.

(56) References Cited

U.S. PATENT DOCUMENTS 6,628,946 B1 * 9/2003 Wiberg ................. H04W 48/12
370/331
8,861,437 B2  10/2014 Stanwood et al.
9,031,017 B2   5/2015 Ratasuk et al.
(Continued)

FOREIGN PATENT DOCUMENTS

CN       104333902 A    2/2015
WO    WO-2015009433    1/2015

OTHER PUBLICATIONS

Catt, "Support of Frequency Reuse One for LAA DL", 3GPP TSG RAN WG1 Meeting #82, R1-153920, Beijing, China, Aug. 24-28, 2015, 3 pgs., XP051001350, 3rd Generation Partnership Project.
(Continued)

*Primary Examiner* — Noel R Beharry
*Assistant Examiner* — Richard Schnell
(74) *Attorney, Agent, or Firm* — Holland & Hart LLP

(57) ABSTRACT

Methods, systems, devices, and apparatuses are described for a listen-before-talk (LBT) mechanism. A wireless node, e.g., a base station, may determine that a channel is available based on completing a clear channel assessment (CCA) procedure. The wireless node may be associated with a first operator. The wireless node may transmit a first message on the channel in a subframe based on the CCA procedure. The first message may include a header portion that precedes a data portion. The first message may be time aligned with a second message transmitted from a second wireless node that is associated with the first operator.

26 Claims, 11 Drawing Sheets

(56) References Cited

U.S. PATENT DOCUMENTS

| | | | |
|---|---|---|---|
| 2005/0169261 A1* | 8/2005 | Williams | H04L 27/2602 370/389 |
| 2007/0223413 A1* | 9/2007 | Igarashi | H04B 1/0475 370/310.2 |
| 2009/0086843 A1* | 4/2009 | Li | H04W 24/08 375/285 |
| 2009/0279514 A1* | 11/2009 | Seok | H04W 74/0816 370/336 |
| 2011/0222486 A1* | 9/2011 | Hart | H04L 5/001 370/329 |
| 2012/0113952 A1* | 5/2012 | Kneckt | H04W 72/0406 370/330 |
| 2013/0044607 A1* | 2/2013 | Liu | H04W 8/26 370/242 |
| 2014/0038625 A1* | 2/2014 | Palanivelu | H04W 52/0235 455/450 |
| 2014/0160951 A1* | 6/2014 | Alpert | H04W 84/12 370/252 |
| 2014/0341018 A1 | 11/2014 | Bhushan et al. | |
| 2014/0341207 A1 | 11/2014 | Bhushan et al. | |
| 2015/0023315 A1 | 1/2015 | Yerramalli et al. | |
| 2015/0146678 A1* | 5/2015 | Kondylis | H04L 5/0073 370/330 |
| 2015/0172950 A1 | 6/2015 | Chen et al. | |
| 2015/0201434 A1* | 7/2015 | Fang | H04W 74/0816 370/335 |
| 2015/0334751 A1* | 11/2015 | Alanen | H04W 48/16 370/329 |
| 2016/0095110 A1* | 3/2016 | Li | H04W 72/1215 370/329 |
| 2016/0212764 A1* | 7/2016 | Yin | H04W 74/0808 |
| 2016/0227428 A1* | 8/2016 | Novlan | H04W 24/10 |
| 2017/0006641 A1* | 1/2017 | Dinan | H04W 74/0833 |
| 2017/0027001 A1* | 1/2017 | Choi | H04W 74/0816 |

OTHER PUBLICATIONS

Huawe et al., "LBT Design for LAA-LAA Coexistence and Support of Reuse 1", 3GPP TSG RAN WG1 Meeting #81, R1-153229, Fukuoka, Japan, May 25-29, 2015, 3 pgs., XP050970982, 3rd Generation Partnership Project.

ISA/EP, International Search Report and Written Opinion of the International Searching Authority, Int'l Application No. PCT/US2016/045583, Oct. 25, 2016, European Patent Office, Rijswijk, Nl, 15 pgs.

ZTE, "Frequency Reuse on Unlicensed Carrier", 3GPP TSG RAN WG1 Meeting #81, R1-153017, Fukuoka, Japan, May 25-29, 2015, 3 pgs., XP050970027, 3rd Generation Partnership Project.

* cited by examiner

LISTEN-BEFORE-TALK MECHANISM

BACKGROUND

Field of the Disclosure

The present disclosure, for example, relates to wireless communication systems, and more particularly to listen-before-talk mechanisms that support simultaneous transmissions on a channel.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

For wireless wide area network (WWAN) communications, base stations (or another network entity) generally coordinate resources for downlink and uplink communications. A wireless node, e.g., base stations and/or UEs, may also communicate using wireless local area network (WLAN) or Wi-Fi techniques that use medium access control mechanisms before communications. Medium access control techniques, e.g., clear channel assessment (CCA) or similar listen-before-talk (LBT) mechanisms, provide access to the medium for the wireless node that senses the medium available.

SUMMARY

The described features generally relate to one or more improved methods, systems, or devices that provide for listen-before-talk (LBT) procedures that support simultaneous transmissions synchronized between wireless nodes associated with the same operator. Generally, wireless nodes, e.g., a base stations, associated with a common operator are synchronized for simultaneous Wi-Fi transmissions. For example, the wireless nodes use wireless wide area network (WWAN) resources to exchange frame alignment, timing, and other radio frame configuration information associated with Wi-Fi controlled transmissions, e.g., long term evolution controlled Wi-Fi (LTE-CW) transmissions. The synchronized wireless nodes perform the same LBT procedure, e.g., clear channel assessment (CCA) procedure, to determine that the channel is available and then each transmit subframe-aligned messages to other nodes, e.g., base station to user equipments (UEs). The messages include a header portion that precedes a data portion. In some examples, the message transmitted in each subframe includes the header and data portions. The header portion includes, in some examples, an indication of the operator the wireless nodes are associated with, e.g., a public land mobile network (PLMN) indicator.

In some aspects, wireless nodes associated with the same operator may use the information included in the header portion to maintain frame alignment for transmission. For example, a wireless node may begin its LBT procedure and detect an interfering transmission, e.g., a Wi-Fi transmission from a neighboring device. The wireless node continues the LBT procedure and decodes a portion of the Wi-Fi transmission (e.g., the header portion) to determine if the transmitting device is associated with the same operator. If the header portion indicates that the transmitting device is associated with the same operator, the wireless node continues its LBT procedure and transmits its message at the subframe boundary, e.g., once the LBT procedure completes. Thus, the wireless node uses the PLMN indicator in the header portion of messages transmitted from wireless nodes associated with the same operator to refrain from considering the transmission an interfering transmission.

In a first illustrative set of examples a method for wireless communication is described. The method may include: determining, at a first wireless node, that a channel is available based at least in part on a clear channel assessment (CCA) procedure performed on the channel, the first wireless node associated with a first operator; and transmitting a first message on the channel during a subframe based at least in part on the determining, the first message time aligned in the subframe with a second message transmitted from a second wireless node associated with the first operator, the first message and the second message comprising a header portion that precedes a data portion.

In some aspects, the first message is unsynchronized with a third message transmitted by a third wireless node associated with a second operator that is different from the first operator. The method may include exchanging radio frame configuration information with the second wireless node via a wireless wide area network (WWAN) communication channel, the radio frame configuration information comprising a timing synchronization field used to time align the first message and the second message. The radio frame configuration information may include a CCA configuration field, the CCA configuration field synchronizing the CCA procedure at the first wireless node with a CCA procedure at the second wireless node.

In some aspects, the method may include modulating the first message transmitted during the subframe according to a modulation scheme. The header portion of the first message may include the same information as the header portion of the second message. The data portion of the first message may include different information from the data portion of the second message. The channel may include multiple sub-bands and the first message and the second message are synchronized across each sub-band of the multiple sub-bands.

In some aspects, the header portions of the first message and the second message may include a Wi-Fi preamble, the Wi-Fi preamble comprising Wi-Fi specific information and wireless wide area network (WWAN) specific information. The Wi-Fi specific information is decodable by the first wireless node, the second wireless node, and a Wi-Fi configured wireless node. The WWAN specific information is undecodable by a Wi-Fi configured wireless node. The method may include transmitting additional messages via the channel during a plurality of subframes following the CCA procedure, each additional message comprising the header portion and the data portion in the subframe, wherein the header portion is the same in each subframe.

In some aspects, the method may include performing a request-to-send/clear-to-send (RTS/CTS) procedure on the channel prior to transmitting the first message. The method may include including a clear-to-send-to-self (CTS-S) field in the header portion of the first message. The method may include transmitting a pilot tone on an unlicensed radio frequency spectrum band using a Wi-Fi configured protocol; and receiving, via a wireless wide area network (WWAN), a channel condition report from a wireless node associated with the first operator. The pilot tone is transmitted subsequent to the header portion of the first message and precedes the data portion of the first message.

In some aspects, the method may include detecting an interfering message transmitted from a third wireless node during the CCA procedure; determining that the third wireless node is associated with the first operator; and transmitting the first message based at least in part on determining that the third wireless node is associated with the first operator. Determining that the third wireless node is associated with the first operator may include decoding a header portion of the interfering message. The method may include identifying a failure of the decoding of the header portion of the interfering message; and refraining from transmitting the first message during the subframe based at least in part on the identified failure, the refraining further based at least in part on an energy level associated with the interfering message being below a threshold level.

In some aspects, the method may include detecting an interfering message transmitted from a third wireless node during the CCA procedure; determining that the third wireless node is unassociated with the first operator; and refraining from transmitting the first message based at least in part on determining that the third wireless node is unassociated with the first operator. The channel is associated with synchronized long term evolution controlled Wi-Fi (LTE-CW) communications. The header portions of the first message and the second message may include an operator identifier field associated with a public land mobile network (PLMN) operator.

In a second illustrative set of examples, an apparatus for wireless communication is described. The apparatus may include: a processor; memory in electronic communication with the processor; and instructions stored in the memory. The instructions being executable by the processor to: determine, at a first wireless node, that a channel is available based at least in part on a clear channel assessment (CCA) procedure performed on the channel, the first wireless node associated with a first operator; and transmit a first message on the channel during a subframe based at least in part on the determining, the first message time aligned in the subframe with a second message transmitted from a second wireless node associated with the first operator, the first message and the second message comprising a header portion that precedes a data portion.

In some aspects, the first message is unsynchronized with a third message transmitted by a third wireless node associated with a second operator that is different from the first operator. The apparatus may include instructions executable by the processor to: exchange radio frame configuration information with the second wireless node via a wireless wide area network (WWAN) communication channel, the radio frame configuration information comprising a timing synchronization field used to time align the first message and the second message. The radio frame configuration information may include a CCA configuration field, the CCA configuration field synchronizing the CCA procedure at the first wireless node with a CCA procedure at the second wireless node.

In some aspects, the apparatus may include instructions executable by the processor to modulate the first message transmitted during the subframe according to a modulation scheme. The header portion of the first message may include the same information as the header portion of the second message.

In a third illustrative set of examples, an apparatus for wireless communication is described. The apparatus may include: means for determining, at a first wireless node, that a channel is available based at least in part on a clear channel assessment (CCA) procedure performed on the channel, the first wireless node associated with a first operator; and means for transmitting a first message on the channel during a subframe based at least in part on the determining, the first message time aligned in the subframe with a second message transmitted from a second wireless node associated with the first operator, the first message and the second message comprising a header portion that precedes a data portion.

In a fourth illustrative set of examples, a non-transitory computer-readable medium storing computer-executable code for wireless communication is described. The code executable by a processor to: determine, at a first wireless node, that a channel is available based at least in part on a clear channel assessment (CCA) procedure performed on the channel, the first wireless node associated with a first operator; and transmit a first message on the channel during a subframe based at least in part on the determining, the first message time aligned in the subframe with a second message transmitted from a second wireless node associated with the first operator, the first message and the second message comprising a header portion that precedes a data portion.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
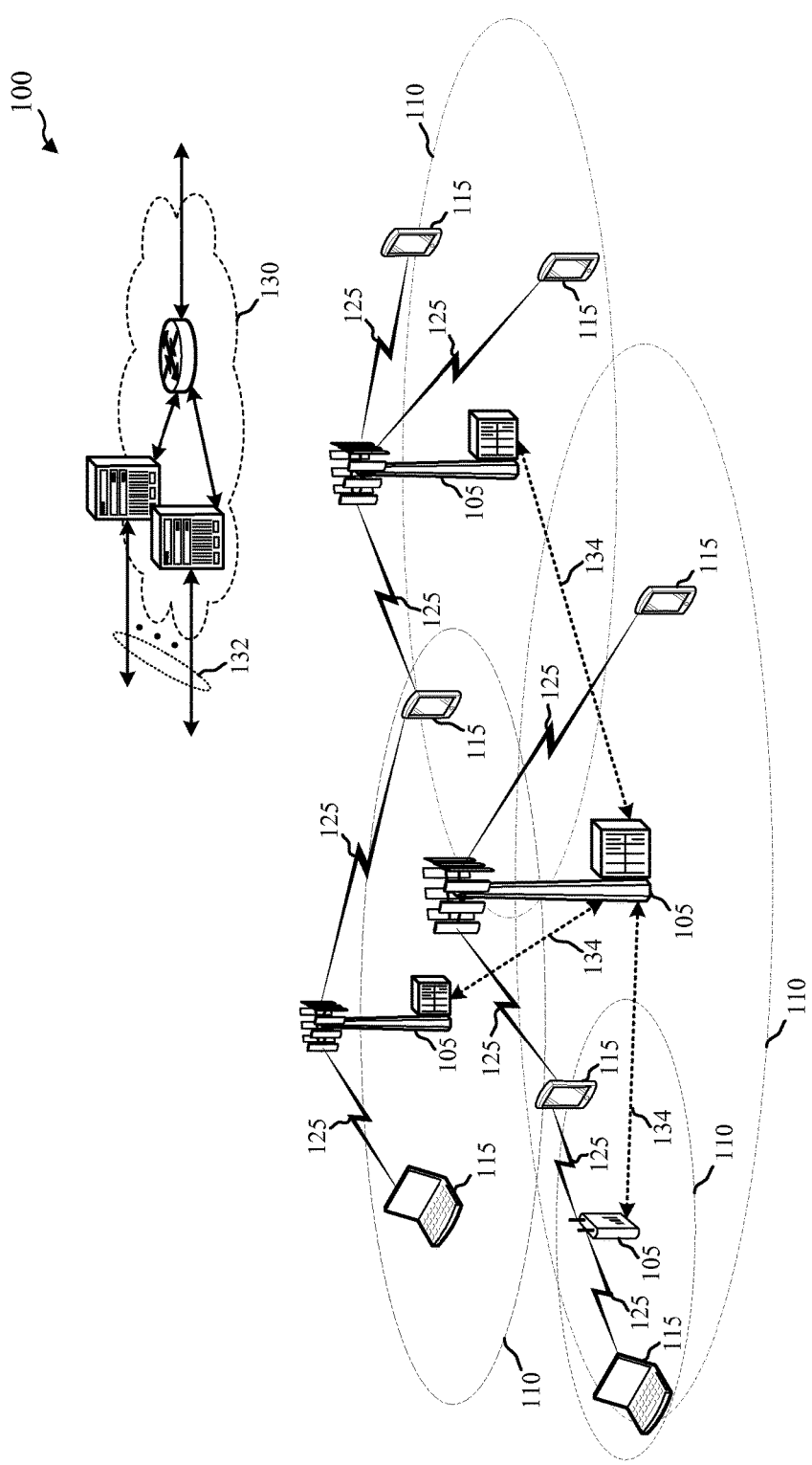
FIG. 1 shows a diagram of a wireless communication system, in accordance with various aspects of the present disclosure.

Long term evolution (LTE) and Wi-Fi are two complementary technologies that coexist in state-of-the-art mobile phones. One of the useful properties of Wi-Fi is high peak data communication rates available at a relatively low cost, but may have shortcomings compared with LTE. In LTE-controlled Wi-Fi (LTE-CW) the robustness of the licensed band is leveraged to use an LTE link to improve performance and coverage of the Wi-Fi link in the unlicensed band. In LTE-CW, a low bandwidth LTE carrier is used to handle the essential control procedures as well as the functions affecting the coverage area/range of Wi-Fi on the unlicensed band, and data transmissions are sent over the Wi-Fi link to take advantage of the associated high data rate communication.

According to aspects of the present description, a wireless node, e.g., a base station configured for LTE-CW communications, participates in simultaneous transmissions that are synchronized across base stations associated with the same operator, e.g., public land mobile network (PLMN) operator. Base stations associated with the same operator exchange various radio frame configuration information using the wireless wide area network (WWAN), e.g., cellular radio access technology communications, to establish and maintain synchronization. The base stations perform the same clear channel assessment (CCA), or similar listen-before-talk (LBT) procedure, to ensure the channel is available. The base stations transmit downlink messages on the channel that are aligned in the subframe. The base stations includes a header portion in the message before the data portion. In some aspects, the header portion includes an indication of the operator (e.g., PLMN indicator field) that the base station is associated with.

In some aspects, a base station may use the PLMN indicator field to maintain message transmission synchronization when experiencing interfering transmissions. For example, a base station may detect an interfering transmission during the CCA procedure. The interfering transmission may be a Wi-Fi transmission originating from a wireless local area network (WLAN) device. The base station determines that the channel is therefore not available and refrains from initiating its message transmission. The base station continues its CCA procedure (or starts a second CCA procedure) at the following subframe to determine if the channel is available. By the next subframe, the interfering transmission may have terminated, but the base station may still detect message transmissions that originate from other base stations associated with the same operator. The base station may decode the header portion of the transmitted messages to determine that the message transmission is from a common operator base station, e.g., associated with the same operator. Based on the common operator base station, the base station may determine that the message transmission is not an interfering transmission and begin to transmit its message at the boundary of the next subframe. Its message may also include a header portion that precedes the data portion in the subframe.

Other aspects may include the base station performing a request-to-send/clear-to-send (RTS/CTS) procedure prior to transmitting the header portion of the message. The CTS may be a self-addressed CTS message, e.g., a CTS message addressed to the transmitting base station. Further aspects provide for a pilot signal transmission in the message. For example, the base station may transmit a pilot signal in an unlicensed band for receiving device(s) to report channel quality information (CQI). Additional aspects provide for the header portion to include a Wi-Fi compatible preamble. The preamble may include Wi-Fi specific information that can be decoded and interpreted by Wi-Fi devices and LTE-CW devices and LTE-CW specific information that can only be interpreted by LTE-CW devices. In some examples, the header portion of the transmitted messages are the same across all bases station participating in the LTE-CW communications and associated with the same operator.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may support LTE-CW communications. LTE-CW is generally a synchronized system and its frame structure is similar to a LTE-TDD system, e.g., using a superframe of 10 milliseconds consisting of 10 subframes of 1 millisecond each. In an LTE-CW system, LTE-CW base stations (e.g., base stations 105) may perform simultaneous message transmissions. For example, the base stations 105 may perform a CCA procedure to determine if the channel is available. The CCA procedure may be the same for all base stations 105 that are associated with the same operator, e.g., may be time synchronized, may use a common backoff parameter, etc. The base station 105 may then transmit a message in a subframe that is time aligned with messages transmitted from other base stations 105 that are associated with the same operator. The message transmission from the base stations 105 associated with the same operator are aligned in the subframe and include a header portion that precedes the data portion. The header portion may include an indication of the common operator, e.g., a PLMN indicator. The message may be transmitted using LTE-CW communication protocols.

Figure 2:
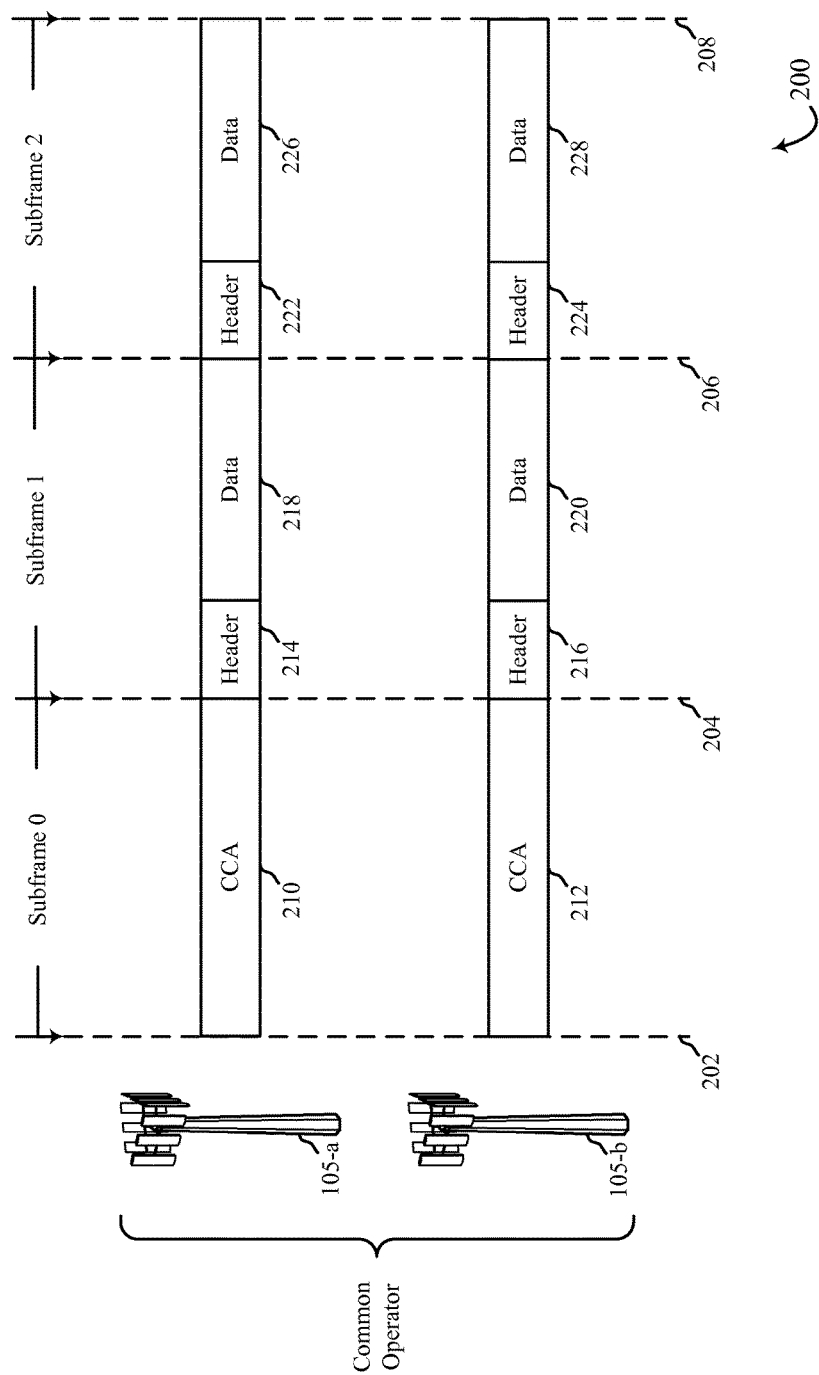
FIG. 2 shows a diagram of an example of simultaneous transmission in a wireless communication system, in accordance with various aspects of the present disclosure.

FIG. 2 is a diagram 200 that shows an example of simultaneous message transmission in a wireless communication system, in accordance with various aspects of the present disclosure. The diagram 200 may illustrate aspects of the wireless communications system 100 described with reference to FIG. 1. Diagram 200 includes two wireless nodes, illustrated as base station 105-*a* and base station 105-*b*, that are configured simultaneous transmissions over a channel. Base stations 105-*a* and/or 105-*b* may be configured for LTE-CW communications. Base stations 105-*a* and/or 105-*b* may be examples of a base station 105 described with reference to FIG. 1. In some examples, a system device, such as one of the base stations 105 may execute one or more sets of codes to control the functional elements of the device to perform some or all of the functions described below.

Generally, diagram 200 shows simultaneous transmissions occurring during subframes 0-2. Subframe 0 spans the period between 202 and 204, subframe 1 spans the period between 204 and 206, and subframe 2 spans the period between 206 and 208. Although diagram 200 shows an example of simultaneous transmissions occurring during three subframes, it is to be understood that the described techniques are not limited to three subframes and instead may occur over fewer than three subframes or more than three subframes.

Base stations 105-*a* and 105-*b* may be associated with a common operator, e.g., a common PLMN service provider. Base stations 105-*a* and 105-*b* may exchange various frame configuration information over the WWAN carrier(s), such as timing and/or frame alignment information for LTE-CW communications, CCA procedure parameters, etc. The frame configuration information may be used by the base stations 105-*a* and 105-*b* to perform simultaneous LTE-CW transmissions over a channel. For example, base stations 105-*a* and 105-*b*, respectively, may perform a CCA procedure 210 and 212, respectively, on the channel. The CCA procedures 210 and 212 may be the same, e.g., may utilize the same parameters, start time, stop time, etc. The base stations 105-*a* and 105-*b* determine, based on the CCA procedures 210 and 212, respectively, that the channel is available or otherwise free for transmissions. For example, the CCA procedures 210 and 212 may indicate that no energy has been detected on the channel, or at least no energy detected above a threshold value.

In some examples of a CCA procedure, the base station 105 (e.g., base station 105-*a* and/or base station 105-*b*) may measure the channel energy in the medium during the subframe. If the base station 105 detects a transmission, the base station 105 attempts to decode the physical layer convergence protocol (PLCP) header portions of the transmissions (e.g., to determine if they are Wi-Fi transmissions). The base station 105 may determine that the channel is busy in the subframe if the detected energy level is greater than a predetermined threshold (e.g., −62 dBm) and if decoding the PLCP header portion fails. The base station 105 may determine that the channel is busy in the subframe if the decoding process is successful and the PLCP header portion indicates that the transmission is from a wireless node associated with a different operator. The base station 105 may determine that the channel is available in the subframe if the decoding process is successful and the PLCP header portion indicates that the transmission is from a wireless node associated with the same operator.

The base stations 105-*a* and 105-*b* transmit header portions 214 and 216, respectively, of a message on the channel. The header portions 214 and 216 are followed by data portions 218 and 220, respectively, of the message being transmitted by base stations 105-*a* and 105-*b*. The message (including the header portions 214 and 216 and the data portions 218 and 220) are transmitted on the same channel (the channel cleared by the CCA procedures 210 and 212) and are time synchronized using the frame configuration information. During subframe 2, the base stations 105-*a* and 105-*b* again simultaneously transmit messages comprising header portions 222 and 224 that precede the data portions 226 and 228, respectively. Accordingly, the base stations 105-*a* and 105-*b* may simultaneously transmit messages on the channel following CCA procedures 210 and 212.

In some aspects, the header portions (e.g., header portions 214, 216, 222, and/or 224) of the transmitted messages may include an indication of the common operator, e.g., a PLMN indicator. The PLMN indicator provides a means for other base stations to determine which operator the base stations 105-*a* and 105-*b* are associated with. The header portions may, in some examples, be the same and/or include the similar information for all base stations 105 associated with the common operator.

As is described in greater below, in some aspects the header portions may be preceded and/or includes aspects of a RTS/CTS procedure, pilot signal transmission and CQI reporting, etc. Further, the header portions may include Wi-Fi specific information and LTE-CW specific information.

Figure 3:
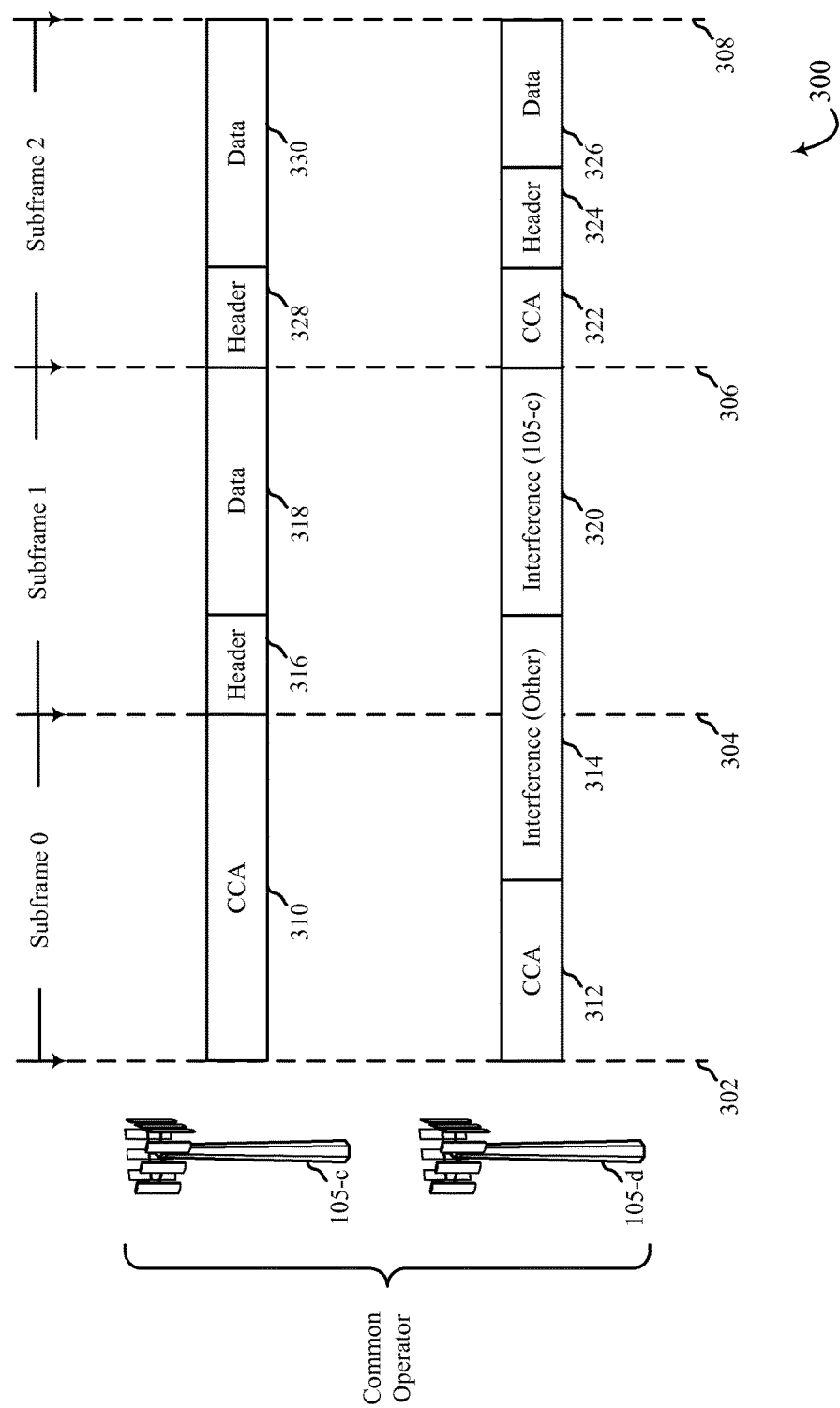
FIG. 3 shows a diagram of another example of simultaneous transmission in a wireless communication system, in accordance with various aspects of the present disclosure.

FIG. 3 is a diagram 300 that shows an example of simultaneous message transmission in a wireless communication system, in accordance with various aspects of the present disclosure. The diagram 300 may illustrate aspects of the wireless communications system 100 and/or diagram 200 described with reference to FIGS. 1 and 2. Diagram 300 includes two wireless nodes, illustrated as base station 105-*c* and base station 105-*d*, that are configured simultaneous transmissions over a channel. Base stations 105-*c* and/or 105-*d* may be configured for LTE-CW communications. Base stations 105-*c* and/or 105-*d* may be examples of a base station 105 described with reference to FIGS. 1 and 2. In some examples, a system device, such as one of the base stations 105 may execute one or more sets of codes to control the functional elements of the device to perform some or all of the functions described below.

Similar to diagram 200, diagram 300 shows simultaneous transmissions occurring during subframes 0-2 that span the periods between 302-304, 304-306, and 306-308, respectively. Diagram 300 is not limited to three subframes and can include more or less subframes. Generally, diagram 300 illustrates aspects of base station 105-d using information included in the header portion of transmitted messages to maintain alignment for simultaneous transmissions.

Base stations 105-c and 105-d may be associated with a common operator, e.g., a common PLMN service provider. Base stations 105-c and 105-d may exchange various frame configuration information over the WWAN carrier(s), such as timing and/or frame alignment information for LTE-CW communications, CCA procedure parameters, etc. The frame configuration information may be used by the base stations 105-c and 105-d to perform simultaneous LTE-CW transmissions over a channel. For example, base stations 105-c and 105-b, respectively, may initiate CCA procedures 310 and 312, respectively, on the channel. Base station 105-d, however, may detect an interfering transmission 314 that originates from another device, e.g., a Wi-Fi transmission from a neighboring device. The count-down process for the CCA procedure 312 for base station 105-d is stopped because of the interfering transmission 314. Base station 105-c, however, may be located a sufficient distance from the interfering transmission 314 that the count-down process for its CCA procedure 310 continues. Once the CCA procedure 310 is complete, base station 105-c therefore begins its message transmission on the channel. The message includes a header portion 316 followed by a data portion 318.

When the interfering transmission 314 ends, the channel remains busy due to the interference 320 caused by the message transmission from base station 105-c. During subframe 2, however, base station 105-d initiates another CCA procedure 322. During the CCA procedure 322, base station 105-d decodes the header portion 328 of the message transmitted by base station 105-c. The header portion 328 includes the PLMN indicator field, which base station 105-d uses to identify the transmission as being from a base station associated with the common operator. For example, base station 105-d may ignore the transmission from base station 105-c even though the channel would otherwise be considered busy based on the detected energy. Accordingly, base station 105-d completes its CCA procedure 322 and begins a message transmission on the channel that includes header portion 324 that precedes data portion 326. Thus, base station 105-d will joint base station 105-c for simultaneous message transmission on the channel during subframe 2 once its CCA procedure 322 is complete. The message transmissions may be LTE-CW transmissions.

Figure 4:
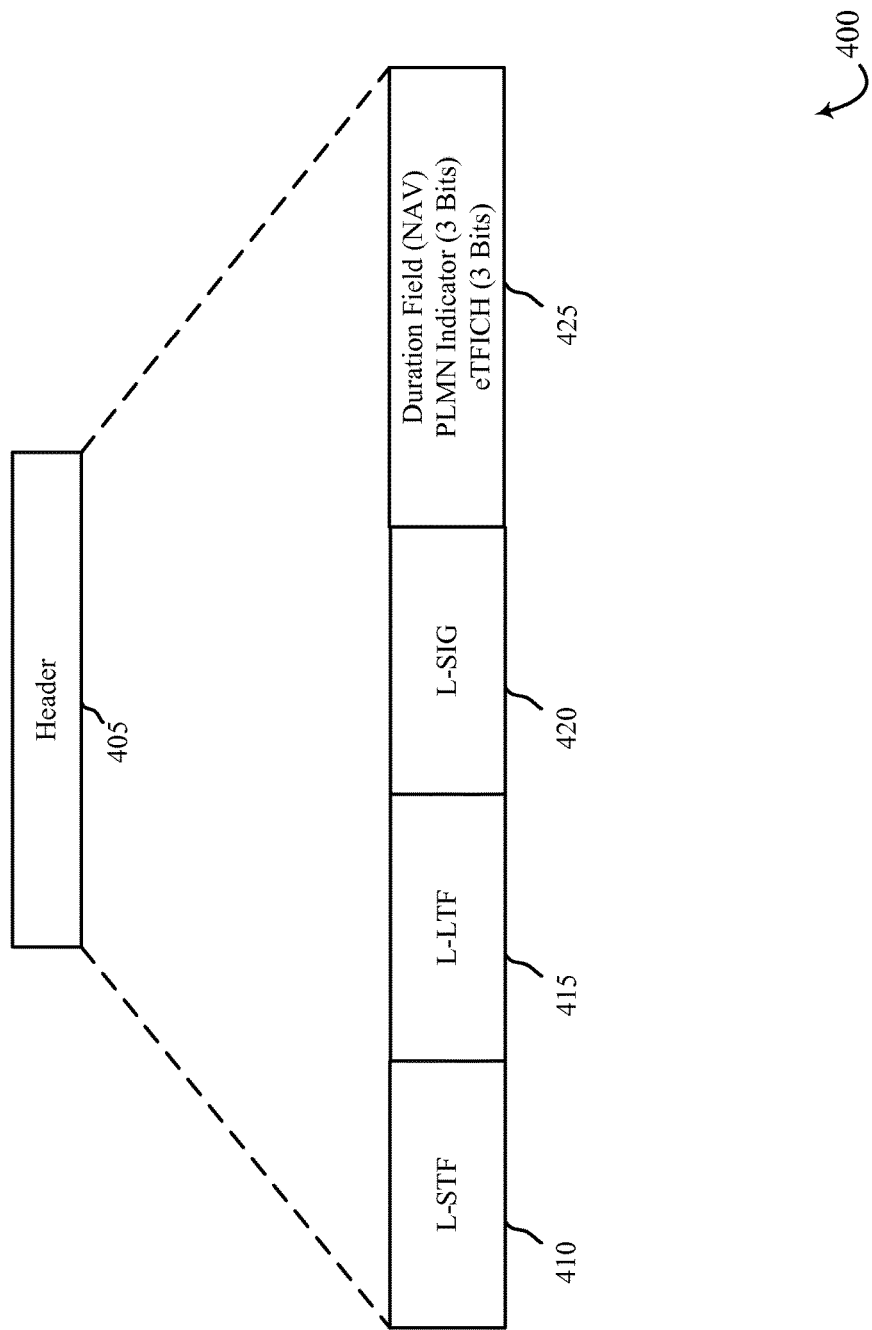
FIG. 4 shows a diagram of an example header used for simultaneous transmission in a wireless communication system, in accordance with various aspects of the present disclosure.

FIG. 4 shows a diagram 400 of an example header 405 used for simultaneous transmission in a wireless communication system, in accordance with various aspects of the present disclosure. Aspects of the diagram 400 may be implemented by a wireless node, such as a base station 105 described with reference to FIGS. 1-3. In some examples, a system device, such as one of the base stations 105 may execute one or more sets of codes to control the functional elements of the device to perform some or all of the functions described below relating to header 405.

As previously discussed, base stations 105 associated with a common operator may perform simultaneous message transmissions on a channel and the messages may include a header portion that precedes a data portion. Generally, header 405 illustrates one example of a header portion. The header 405 may be transmitted on the channel once the CCA procedure is complete. The header 405 may be transmitted at the subframe boundary. In some aspects, each base station 105 associated with a common operator may send the same or substantially similar information in the header 405. Each of the base stations 105 associated with the common operator may transmit the header 405 at the subframe boundary.

The header 405 may include a legacy short training field (L-STF) 410, a legacy long training field (L-LTF) 415, a legacy signal field (L-SIG) 420, and an LTE-CW field 425. Generally, the L-STF 410, L-LTF 415, and L-SIG 420 may collectively comprise a Wi-Fi preamble portion of the header and the LTE-CW field 425 may comprise a LTE-CW specific portion of the header. The Wi-Fi preamble portion may be decoded and interpreted by any device configured for Wi-Fi communications. The LTE-CW specific portion may be decoded by any device, but may be interpreted by devices configured for LTE-CW communications.

The L-STF 410 generally provides a short training field that may be two symbols in length and can be transmitted for backwards compatibility, e.g., for legacy wireless devices. The L-LTF 415 is a legacy long training field that may also be two symbols long. The L-SIG 420 may be one symbol long and may also be transmitted for backwards compatibility.

The LTE-CW field 425 may, in some examples, be a very high throughput signal A field (VHT-SIG-A). The LTE-CW field 425 may comply with 802.11ac standards. The LTE-CW field 425 may include a duration indicator (e.g., a network allocation vector (NAV)) that generally identifies a length of the data portion of the message, e.g., as a function of time. The LTE-CW field 425 may include a PLMN indicator which may, in some examples, by three bits long and conveys an indication of the PLMN operator or service provider that the base station 105 is associated with. The PLMN indicator may be decodable by other devices, but may only be understood by devices configured for LTE-CW communications. The LTE-CW field 425 may also include an enhanced traffic format indicator channel (eTFICH) which generally provides information pertaining to downlink/uplink ratio in a radio frame. In some examples, the PLMN indicator and eTFICH portions of the LTE-CW field 425 may only be understood by devices configured for LTE-CW communications. Generally, the PLMN indicator and the eTFICH portions of the LTE-CW field 425 are identical for all base stations 105 associated with the same or common operator. In multi-band configurations, the header 405 may be repeated in each of the bands.

Figure 5:
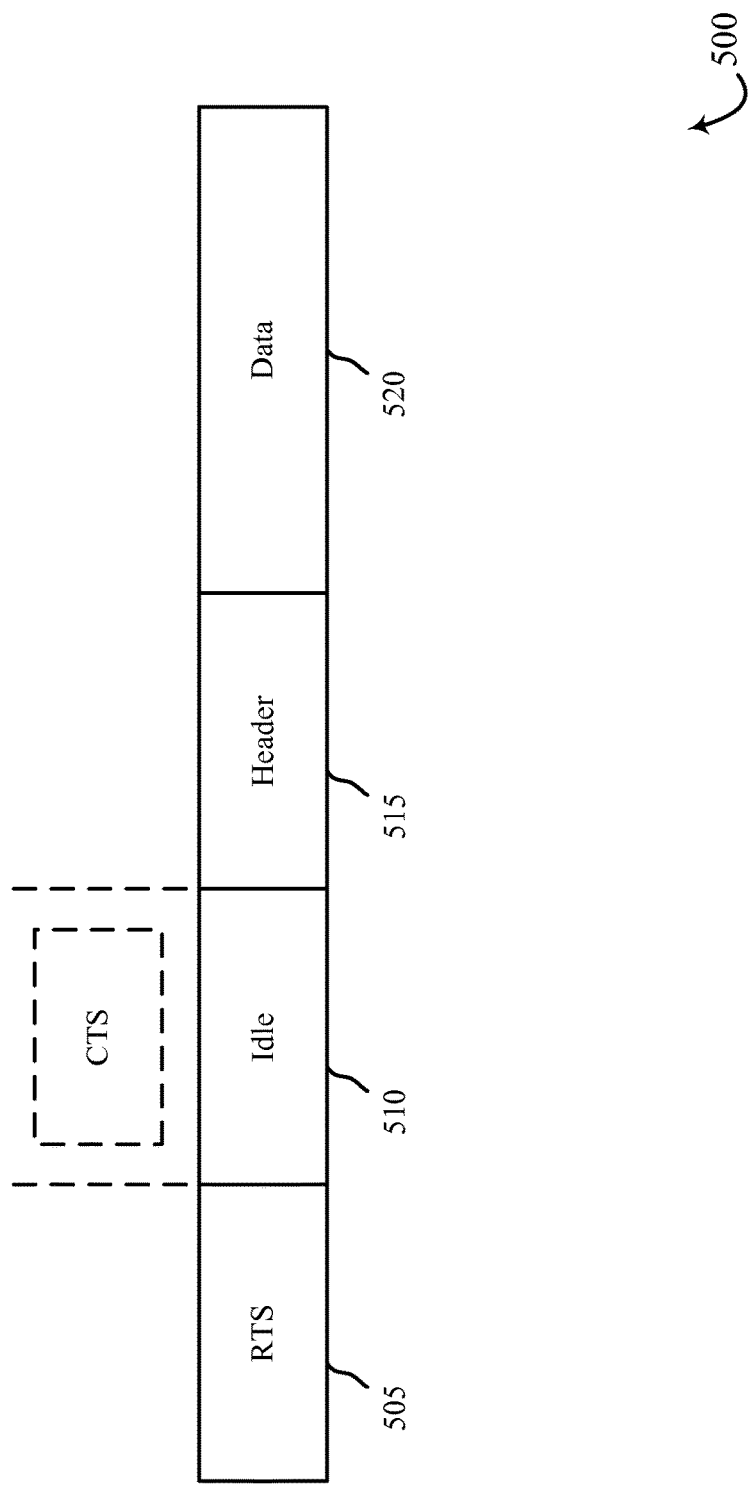
FIG. 5 shows a diagram of an example transmission scheme for use in simultaneous transmission in a wireless communication system, in accordance with various aspects of the present disclosure.

FIG. 5 shows a diagram 500 of an example message format used for simultaneous transmission in a wireless communication system, in accordance with various aspects of the present disclosure. Aspects of the diagram 500 may be implemented by a wireless node, such as a base station 105 described with reference to FIGS. 1-3. In some examples, a system device, such as one of the base stations 105 may execute one or more sets of codes to control the functional elements of the device to perform some or all of the functions described below relating to the example message format.

As previously discussed, base stations 105 associated with a common operator may perform simultaneous message transmissions on a channel and the messages may include a header portion that precedes a data portion. In the example diagram 500, the base station 105 may perform a RTC/CTS procedure prior to transmitting the header portion of the message.

For example, the base station 105 may transmit a RTS message 505 and then wait during an idle period 510 to receive a CTS message. Upon receiving the CTS message, the base station 105 may transmit the header 515 followed by data 520. Generally, the base station 105 may initiate the RTS/CTS frame exchange prior to transmitting the header 515. Another wireless device, e.g., a UE 115, may receive the RTS and determine if there are frames being transmitted from nodes in another network, e.g., such as base stations 105 associated with a different operator and/or other Wi-Fi nodes. If the UE 115 does not detect any frame transmissions, it transmits a CTS message to the base station 105. Thus, the UE 115 may provide an additional indication that the channel is available for LTE-CW message transmissions.

In some examples, the base station 105 may include a CTS frame that is self-addressed in the header 515. This CTS-to-self transmission may be included in the LTE-CW specific portion of the header 405 described with respect to FIG. 4.

Figure 6:
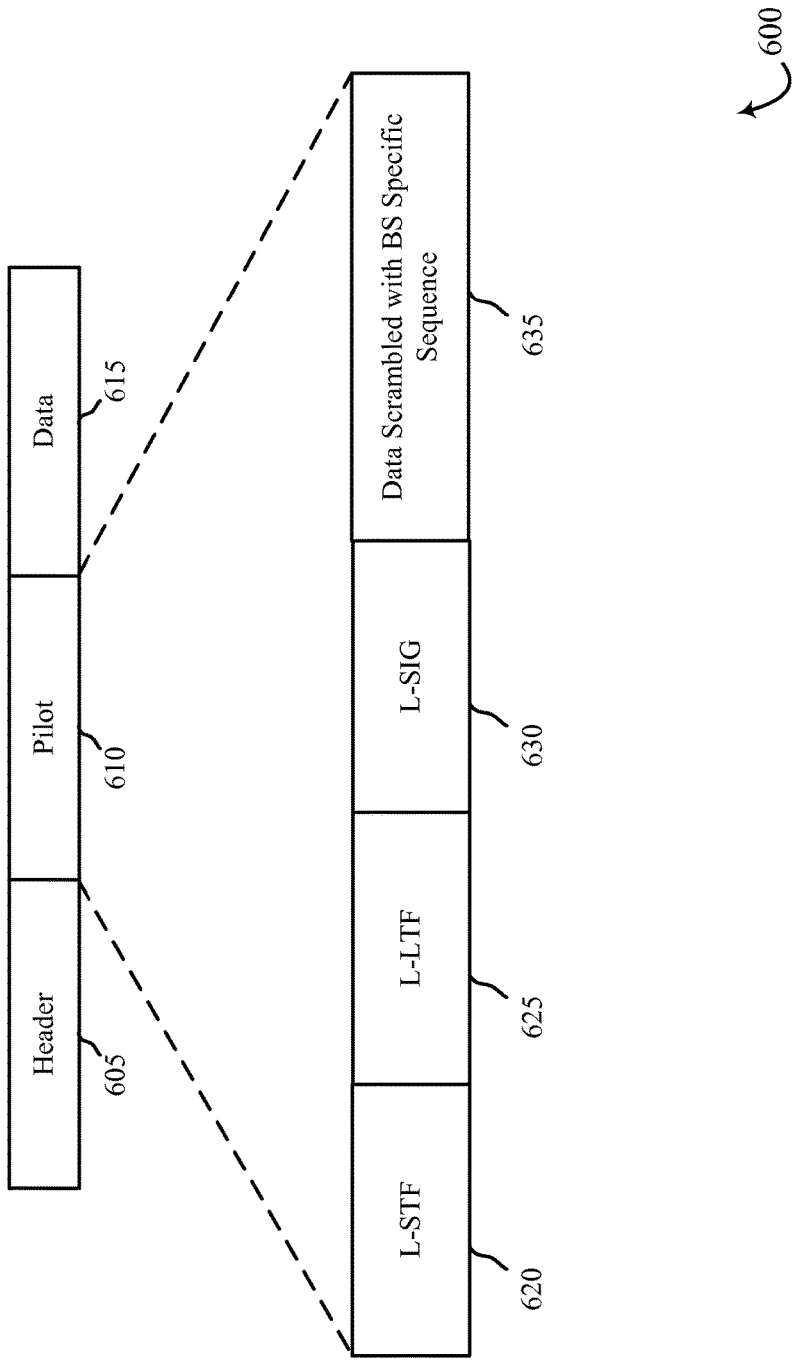
FIG. 6 shows a diagram of another example transmission scheme for use in simultaneous transmission in a wireless communication system, in accordance with various aspects of the present disclosure.

FIG. 6 shows a diagram 600 of an example message format used for simultaneous transmission in a wireless communication system, in accordance with various aspects of the present disclosure. Aspects of the diagram 600 may be implemented by a wireless node, such as a base station 105 described with reference to FIGS. 1-3. In some examples, a system device, such as one of the base stations 105 may execute one or more sets of codes to control the functional elements of the device to perform some or all of the functions described below relating to the example message format.

As previously discussed, base stations 105 associated with a common operator may perform simultaneous message transmissions on a channel and the messages may include a header portion that precedes a data portion. In the example diagram 600, the base station 105 may include a pilot signal 610 transmission after the header 605 and before the data 615 portions of the message.

For example, the pilot signal 610 may include a L-STF 620, a L-LTF 526, and a L-SIG 630, which may be examples of the L-STF 410, a L-LTF 415, and a L-SIG 420, respectively, described with respect to FIG. 4. The pilot signal 610 may also include a LTE-CW specific portion 635 that includes data scrambled with a sequence that is specific to the base station 105.

In some examples, the pilot signal 610 may not be transmitted on the channel cleared by the CCA procedure, but instead may be transmitted on a channel in an unlicensed frequency spectrum band. The base station 105 may transmit the pilot signal 610 in the unlicensed band to request that UEs 115 configured to LTE-CW communications measure and report channel conditions. The UEs 115 may receive pilot signal 610 and transmit a CQI report to the base station 105. The CQI report may be transmitted via a WWAN channel.

Figure 7:
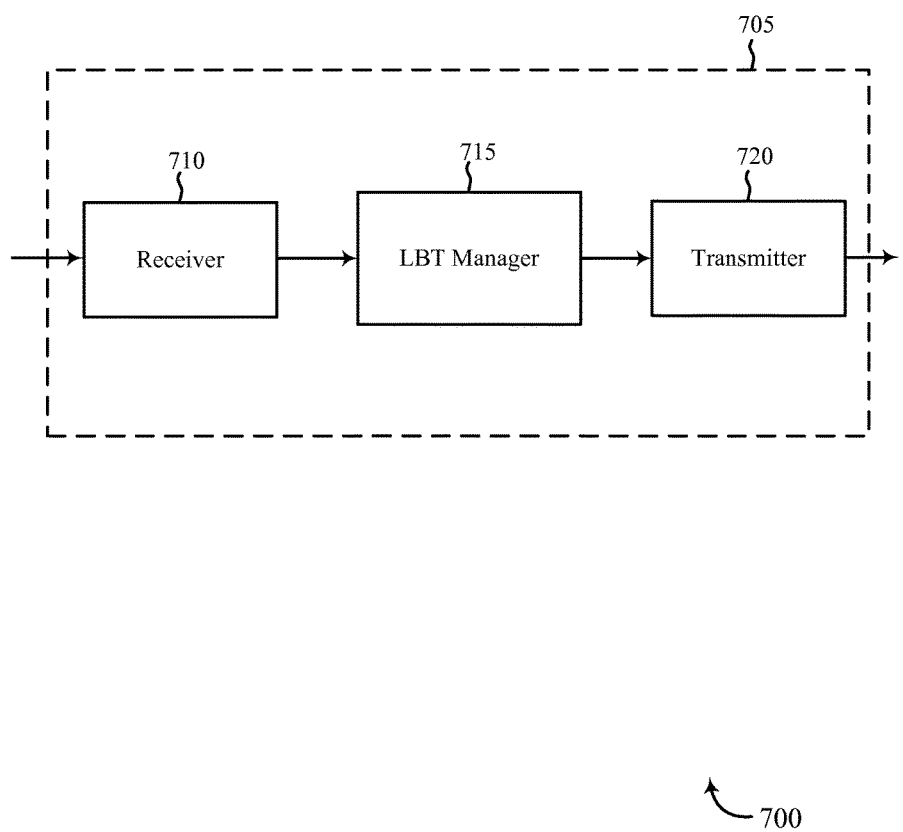
FIG. 7 shows a block diagram of a device configured for use in wireless communication, in accordance with various aspects of the present disclosure.

FIG. 7 shows a block diagram 700 of a device 705 for use in wireless communication, in accordance with various aspects of the present disclosure. The device 705 may be an example of one or more aspects of a wireless node, such as a base station 105 described with reference to FIGS. 1-6. The device 705 may include a receiver 710, a listen-before-talk (LBT) manager 715, and/or a transmitter 720. The device 705 may also be or include a processor (not shown). Each of these modules may be in communication with each other.

The components of the device 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The receiver 710 may receive information such as packets, user data, and/or control information associated with various information channels (e.g., control channels, data channels, etc.). The receiver 710 may be configured to receive various frames related to supporting simultaneous transmissions on a channel. Information may be passed on to the LBT manager 715, and to other components of the device 705.

The LBT manager 715 may monitor, control, provide a means for, or otherwise manage aspects of a LBT procedure to support simultaneous transmissions on a channel for the device 705. For example, the LBT manager 715 may determine that a channel is available based on a CCA procedure performed on the channel. The device 705 may be associated with a first operator, e.g., a common operator or PLMN. The LBT manager 715 may transmit a first message on the channel during a subframe. The first message may be time aligned in the subframe with a second message transmitted from a second wireless node (e.g., a second device 705) that is associated with the same operator. The first message and/or second message may include a header portion that precedes a data portion.

The transmitter 720 may transmit the one or more signals received from other components of the device 705. The transmitter 720 may transmit various frames or messages related to simultaneous transmissions. In some examples, the transmitter 720 may be collocated with the receiver 710 in a transceiver module.

Figure 8:
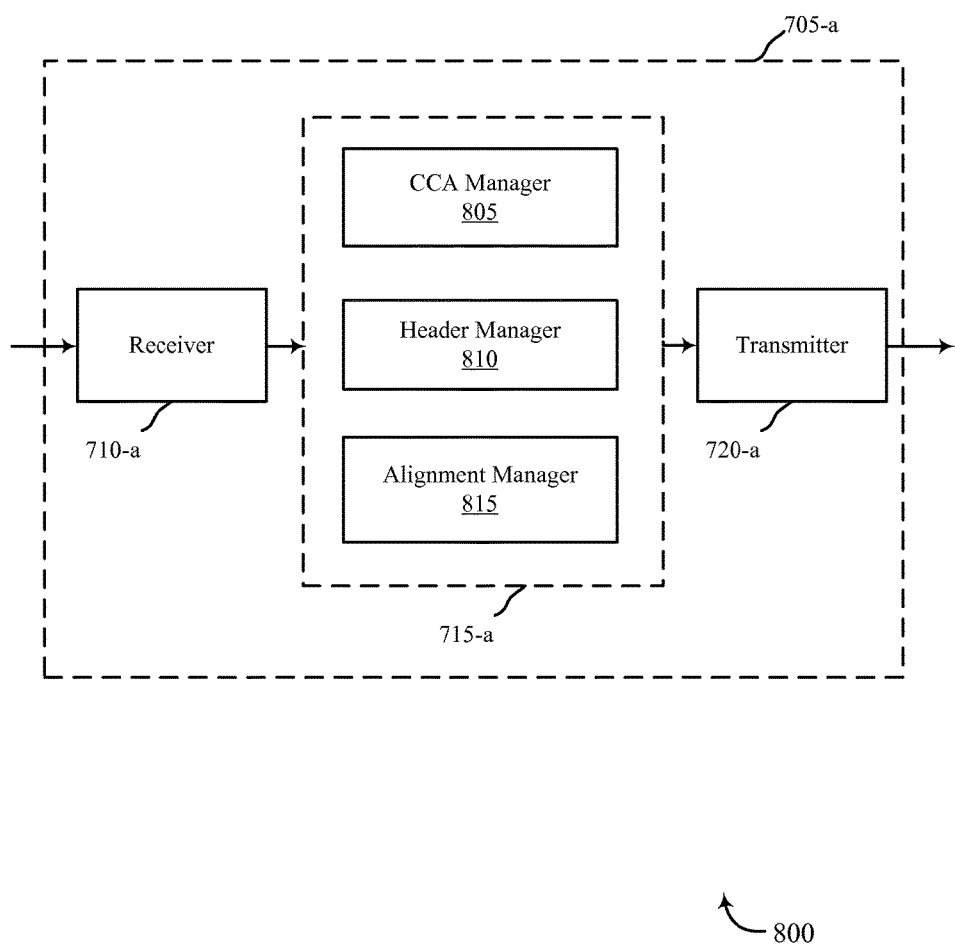
FIG. 8 shows a block diagram of a device configured for use in wireless communication, in accordance with various aspects of the present disclosure.

FIG. 8 shows a block diagram 800 of a device 705-a for use in wireless communication, in accordance with various examples. The device 705-a may be an example of one or more aspects of a base station 105 described with reference to FIGS. 1-6. It may also be an example of a device 705 described with reference to FIG. 7. The device 705-a may include a receiver 710-a, a LBT manager 715-a, and/or a transmitter 720-a, which may be examples of the corresponding modules of device 705. The device 705-a may also include a processor (not shown). Each of these components may be in communication with each other. The LBT manager 715-a may include a CCA manager 805, a header manager 810, and an alignment manager 815. The receiver 710-a and the transmitter 720-a may perform the functions of the receiver 710 and the transmitter 720, of FIG. 7, respectively.

The CCA manager 805 may monitor, control, provide a means for, or otherwise manage aspects of a CCA procedure for the device 705-a. The CCA manager 805 may determine that a channel is available during a subframe based on a CCA procedure performed on the channel. The device 705-a may be associated with a first operator, e.g., PLMN operator. The first channel may be associated with synchronized LTE-CW communications.

In some aspects, the CCA manager 805 may detect an interfering message transmitted from a first wireless node during the CCA procedure. The CCA manager 805 may determine that the third wireless node is associated with the first operator. The CCA manager 805 may, alone or in cooperation with the header manager 810, transmit the first message based on the third wireless node being associated with the first operator. The CCA manager 805 may decode a header portion of the interfering message to determine that the third wireless node is associated with the first operator. The CCA manager 805 may identify a failure of the decoding of the header portion of the interfering message and refrain from transmitting the first message during the subframe based on the identified failure.

In some aspects, the CCA manager 805 may detecting an interfering message transmitted from a third wireless node during the CCA procedure. The CCA manager 805 may determine that the third wireless node is unassociated with the first operator, e.g., is not the same as the first operator. The CCA manager 805 may, alone or in cooperation with the header manager 810, refrain from transmitting the first message based on the determination that the third wireless node is unassociated with the first operator.

The header manager 810 may monitor, control, provide a means for, or otherwise aspects of a header transmission for the device 705-a. The header manager 810 may transmit a first message on the channel during the subframe. The first message may include a header portion that precedes a data portion. The header manager 810 may module the first message transmitted during the subframe according to a modulation scheme. The header portion of the first message may be the same as a header portion of the second message. The data portion of the first message may be different from the information in a data portion of the second message. The header portions of the first message and the second message may include an operator identifier field associated with a PLMN operator.

In some aspects, the channel may include multiple sub-bands and the first and second message may be transmitted and synchronized across each sub-band of the multiple sub-bands. The header portions of the first and/or second messages may include a Wi-Fi preamble that includes Wi-Fi specific information and a WWAN specific information. The Wi-Fi specific information may be decodable by the first wireless node, the second wireless node, and a Wi-Fi configured wireless node. The WWAN specific information may be undecodable by a Wi-Fi configured wireless node.

In some aspects, the header manager 810 may transmit additional messages on the channel during a plurality of subframes following the CCA procedure. Each additional message may include the header portion and the data portion in the subframe. The header portion may be the same in each subframe. In some aspects, the header manager 810 may perform a RTS/CTS procedure on the channel prior to transmitting the message. The header manager 810 may include a CTS-to-self (CTS-S) field in the header portion of the first message.

In some aspects, the header manager 810 may transmit a pilot tone on an unlicensed radio frequency spectrum band using a Wi-Fi configured protocol. The header manager 810 may receive, via a WWAN communication channel, a channel condition report from a wireless node associated with the first operator. The pilot tone may be transmitted subsequent to the header portion of the first message and may precede the data portion of the first message.

The alignment manager 815 may monitor, control, provide a means for, or otherwise aspects of a subframe alignment for the device 705-a. The alignment manager 815 may time align the first message with a second message transmitted from another wireless node, e.g., another device 705-a, that is associated with the first operator. The first message may be unsynchronized with a third message transmitted by a wireless node associated with a second operator. The second operator may be different from the first operator.

In some aspects, the alignment manager 815 may exchange radio frame information with the second wireless node via a WWAN communication channel. The radio frame configuration information may include a timing synchronization field used to time align the first message and the second message. The radio frame information may include various CCA parameters, e.g., a CCA configuration field that synchronizes the CCA procedure at the first wireless node with a CCA procedure at the second wireless node.

Figure 9:
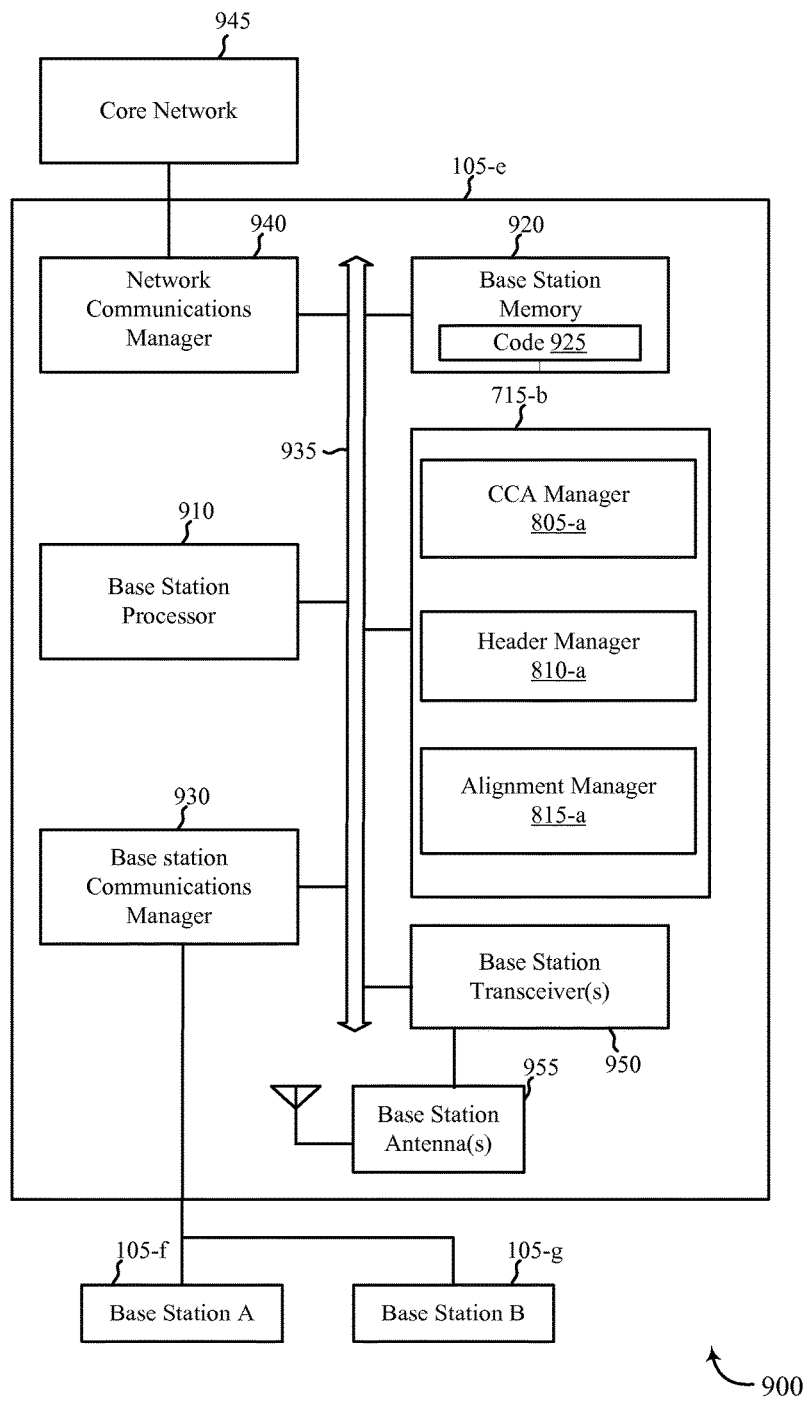
FIG. 9 shows a block diagram of a base station (e.g., a base station forming part or all of an eNB) for use in wireless communication, in accordance with various aspects of the present disclosure.

FIG. 9 shows a block diagram 900 of a base station 105-e (e.g., a base station forming part or all of an eNB) for use in wireless communication, in accordance with various aspects of the present disclosure. In some examples, the base station 105-e may be an example of aspects of one or more of the base stations 105 described with reference to FIGS. 1-6, and/or aspects of one or more of the devices 705 when configured as a base station, as described with reference to FIGS. 7 and/or 8. The base station 105-e may be configured to implement or facilitate at least some of the base station and/or apparatus features and functions described with reference to FIGS. 1-6.

The base station 105-e may include a base station processor 910, a base station memory 920, at least one base station transceiver (represented by base station transceiver(s) 950), at least one base station antenna (represented by base station antenna(s) 955), and/or a LBT manager 715-b. The base station 105-e may also include one or more of a base station communications manager 930 and/or a network communications manager 940. Each of these components may be in communication with each other, directly or indirectly, over one or more buses 935.

The base station memory 920 may include random access memory (RAM) and/or read-only memory (ROM). The base station memory 920 may store computer-readable, computer-executable software/firmware code 925 containing instructions that are configured to, when executed, cause the base station processor 910 to perform various functions described herein related to wireless communication (e.g., simultaneous transmissions on a channel after a successful CCA procedure, etc.). Alternatively, the computer-readable, computer-executable software/firmware code 925 may not be directly executable by the base station processor 910 but be configured to cause the base station 105-e (e.g., when compiled and executed) to perform various of the functions described herein.

The base station processor 910 may include an intelligent hardware device, e.g., a central processing unit (CPU), a microcontroller, an ASIC, etc. The base station processor 910 may process information received through the base station transceiver(s) 950, the base station communications manager 930, and/or the network communications manager 940. The base station processor 910 may also process information to be sent to the transceiver(s) 950 for transmission through the antenna(s) 955, to the base station communications manager 930, for transmission to one or more other base stations 105-f and 105-g, and/or to the network communications manager 940 for transmission to a core network 945, which may be an example of one or more aspects of the core network 130 described with reference to FIG. 1. The base station processor 910 may handle, alone or in connection with the LBT manager 715-b, various aspects of simultaneous transmissions in a subframe on a channel that is determined available using a CCA procedure.

The base station transceiver(s) 950 may include a modem configured to modulate packets and provide the modulated packets to the base station antenna(s) 955 for transmission, and to demodulate packets received from the base station antenna(s) 955. The base station transceiver(s) 950 may, in some examples, be implemented as one or more base station transmitter components and one or more separate base station receiver components. The base station transceiver(s) 950 may support communications in a first radio frequency spectrum band and/or a second radio frequency spectrum band. The base station transceiver(s) 950 may be configured to communicate bi-directionally, via the antenna(s) 955, with one or more UEs or apparatuses, such as one or more of the UEs 115 described with reference to FIGS. 1-6. The base station 105-e may, for example, include multiple base station antennas 955 (e.g., an antenna array). The base station 105-e may communicate with the core network 945 through the network communications manager 940. The base station 105-e may also communicate with other base stations, such as the base stations 105-e and 105-f, using the base station communications manager 930. Base stations 105-f and/or 105-g may be associated with the same operator as base station 105-e, or with a different operator.

The LBT manager 715-b may be configured to perform and/or control some or all of the features and/or functions described with reference to FIGS. 1-6 related to simultaneous transmissions in a LTE-CW channel. In some examples, LBT manager 715-b may determine that the channel is available using a CCA procedure and transmit a first message on the channel that includes a header portion and a data portion. The first message may be transmitted time aligned with a second message transmitted from a second base station associated with the same operator. The LBT manager 715-b, or portions of the LBT manager 715-b, may include a processor, and/or some or all of the functions of the LBT manager 715-b may be performed by the base station processor 910 and/or in connection with the base station processor 910. In some examples, the LBT manager 715-b may be an example of the LBT manager 715 described with reference to FIGS. 7 and/or 8. For example, the LBT manager 715-b may include a CCA manager 805-a, a header manager 810-a, and/or an alignment manager 815-a, which may be examples of and perform the functions of the CCA manager 805, the header manager 810, and/or the alignment manager 815, respectively, described with reference to FIG. 8.

Figure 10:
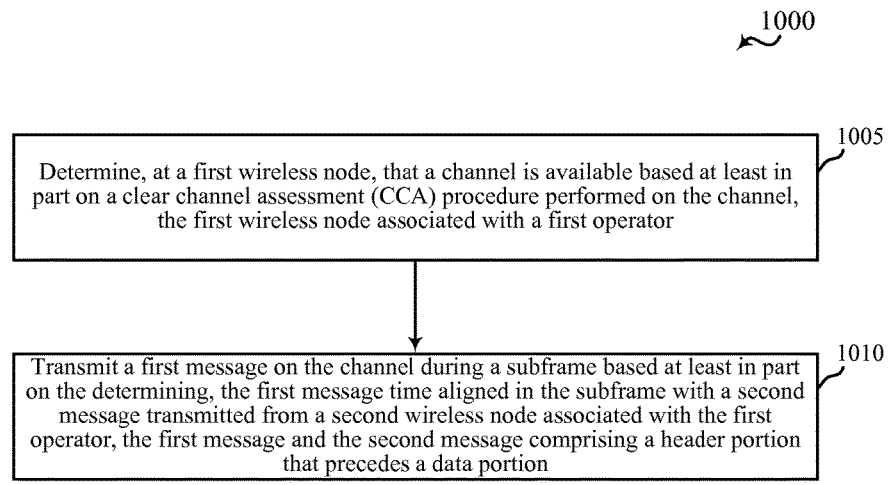
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the base stations 105 described with reference to FIGS. 1-6 and 9, and/or aspects of one or more of the devices described with reference to FIGS. 7 and 8. In some examples, the method 1000 may be performed by a wireless node, such as a base station 105. In some examples, a base station may execute one or more sets of codes to control the functional elements of the base station to perform the functions described below. Additionally or alternatively, the base station may perform one or more of the functions described below using special-purpose hardware.

At block 1005, the method 1000 may include the base station determining that a channel is available based at least in part on a CCA procedure performed on the channel. The base station may be associated with a wireless node. The operations at block 1005 may be performed using the CCA manager 805 described with reference to FIGS. 8 and/or 9.

At block 1010, the method 1000 may include the base station transmitting a first message on the channel during a subframe based on the determining. The first message may be time aligned in the subframe with a second message transmitted from a second wireless node (e.g., a second base station) associated with the first operator. The first and second messages may include a header portion that precedes a data portion. The operations at block 1010 may be performed using the header manager 810 and/or the alignment manager 815 described with reference to FIGS. 8 and/or 9.

Figure 11:
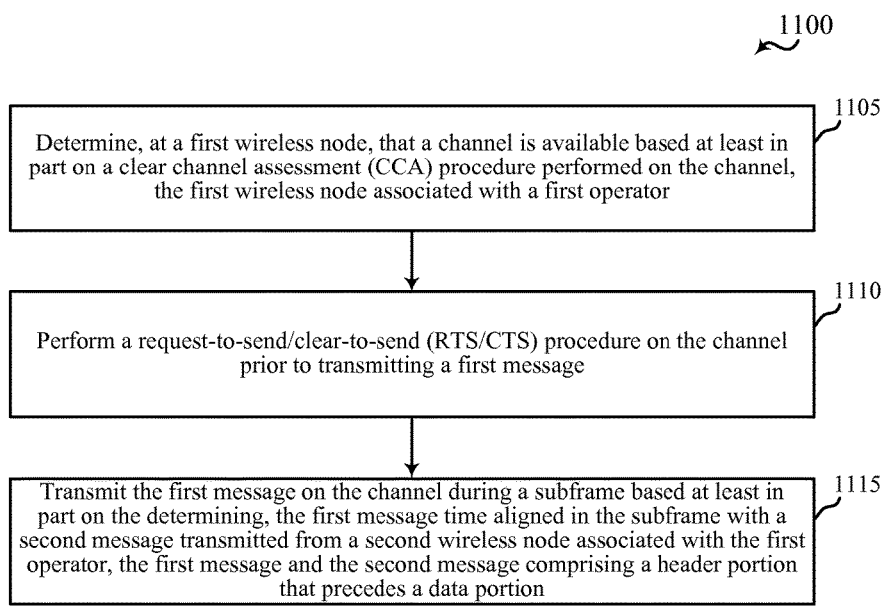
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the base stations 105 described with reference to FIGS. 1-6 and 9, and/or aspects of one or more of the devices described with reference to FIGS. 7 and 8. In some examples, the method 1100 may be performed by a wireless node, such as a base station 105. In some examples, a base station may execute one or more sets of codes to control the functional elements of the base station to perform the functions described below. Additionally or alternatively, the base station may perform one or more of the functions described below using special-purpose hardware.

At block 1105, the method 1100 may include the base station determining that a channel is available based at least in part on a CCA procedure performed on the channel. The base station may be associated with a wireless node. The operations at block 1105 may be performed using the CCA manager 805 described with reference to FIGS. 8 and/or 9.

At block 1110, the method 1100 may include the base station performing a RTS/CTS procedure on the channel. The operations at block 1110 may be performed using the header manager 810 described with reference to FIGS. 8 and/or 9.

At block 1115, the method 1100 may include the base station transmitting a first message on the channel during a subframe based on the determining. The first message may be time aligned in the subframe with a second message transmitted from a second wireless node (e.g., a second base station) associated with the first operator. The first and second messages may include a header portion that precedes a data portion. The operations at block 1115 may be performed using the header manager 810 and/or the alignment manager 815 described with reference to FIGS. 8 and/or 9.

Figure 12:
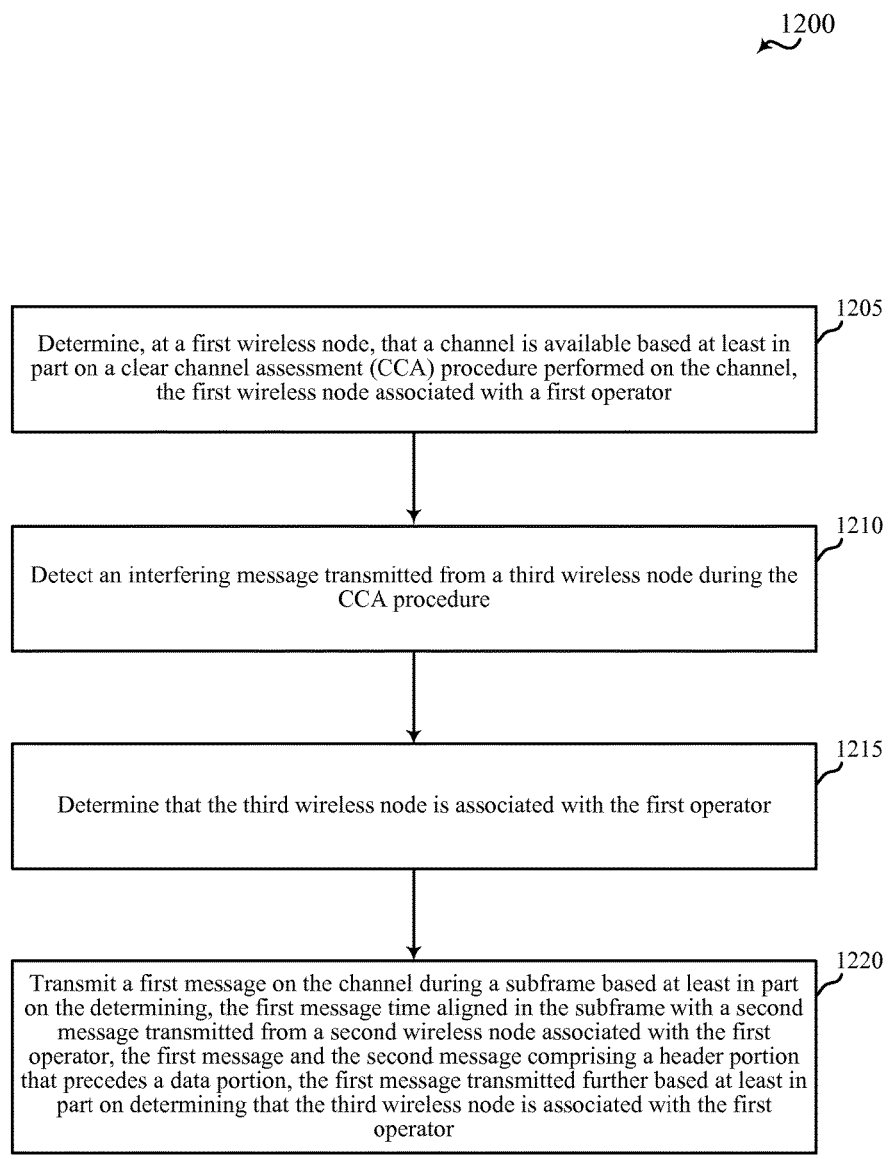
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base stations 105 described with reference to FIGS. 1-6 and 9, and/or aspects of one or more of the devices described with reference to FIGS. 7 and 8. In some examples, the method 1200 may be performed by a wireless node, such as a base station 105. In some examples, a base station may execute one or more sets of codes to control the functional elements of the base station to perform the functions described below. Additionally or alternatively, the base station may perform one or more of the functions described below using special-purpose hardware.

At block 1205, the method 1200 may include the base station determining that a channel is available based at least in part on a CCA procedure performed on the channel. The base station may be associated with a wireless node. The operations at block 1105 may be performed using the CCA manager 805 described with reference to FIGS. 8 and/or 9.

At block 1210, the method 1200 may include the base station detecting an interfering message transmitted from a third wireless node during the CCA procedure. The operations at block 1210 may be performed using the CCA manager 805 described with reference to FIGS. 8 and/or 9.

At block 1215, the method 1200 may include the base station determining that the third wireless node is associated with the first operator. The operations at block 1215 may be performed using the CCA manager 805 and/or the header manager 810 described with reference to FIGS. 8 and/or 9.

At block 1220, the method 1200 may include the base station transmitting a first message on the channel during a subframe based on the determining. The first message may be time aligned in the subframe with a second message transmitted from a second wireless node (e.g., a second base station) associated with the first operator. The first and second messages may include a header portion that precedes a data portion. The base station may transmit the first message further based on determining that the third wireless node is associated with the first operator. The operations at block 1220 may be performed using the header manager 810 and/or the alignment manager 815 described with reference to FIGS. 8 and/or 9.

In some examples, aspects from two or more of the methods 1000-1200 may be combined. It should be noted that the methods 1000, etc., are just example implementations, and that the operations of the methods 1000-1200 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   determining, at a first wireless node, that a channel is busy due to a second wireless node based at least in part on a clear channel assessment (CCA) procedure performed on the channel, the first wireless node associated with a first operator;
   decoding, at the first wireless node, a header of a message transmitted by the second wireless node, the header comprising an indication of the second wireless node being associated with the first operator;
   exchanging radio frame configuration information with the second wireless node via a wireless wide area network (WWAN) communication channel, the radio frame configuration information comprising a timing synchronization field for time aligning a first message associated with the first wireless node and a second message transmitted from the second wireless node and a CCA configuration field for synchronizing the CCA procedure at the first wireless node with a CCA procedure at the second wireless node such that the CCA procedure at the first wireless node is in alignment with the CCA procedure at the second wireless node; and
   transmitting the first message on the channel busy due to the second wireless node during a subframe based at least in part on the indication, the first message time aligned in the subframe with the second message.

2. The method of claim 1, wherein the first message is unsynchronized with a third message transmitted by a third wireless node associated with a second operator that is different from the first operator.

3. The method of claim 1, further comprising:
   modulating the first message transmitted during the subframe according to a modulation scheme.

4. The method of claim 1, wherein a header portion of the first message comprises the same information as a header portion of the second message.

5. The method of claim 1, wherein a data portion of the first message comprises different information from a data portion of the second message.

6. The method of claim 1, wherein the channel comprises multiple sub-bands and the first message and the second message are synchronized across each sub-band of the multiple sub-bands.

7. The method of claim 1, wherein a header portion of the first message and a header portion of the second message each comprise a Wi-Fi preamble, the Wi-Fi preamble comprising Wi-Fi specific information and WWAN specific information.

8. The method of claim 7, wherein the Wi-Fi specific information is decodable by the first wireless node, the second wireless node, and a Wi-Fi configured wireless node.

9. The method of claim 7, wherein the WWAN specific information is undecodable by a Wi-Fi configured wireless node.

10. The method of claim 1, further comprising:
    transmitting additional messages via the channel during a plurality of subframes following the CCA procedure, each additional message comprising a header portion and a data portion in the subframe, wherein the header portion is the same in each subframe.

11. The method of claim 1, further comprising:
    performing a request-to-send/clear-to-send (RTS/CTS) procedure on the channel prior to transmitting the first message.

12. The method of claim 1, further comprising:
    including a clear-to-send-to-self (CTS-S) field in a header portion of the first message.

13. The method of claim 1, further comprising:
    transmitting a pilot tone on an unlicensed radio frequency spectrum band using a Wi-Fi configured protocol; and
    receiving, via a WWAN, a channel condition report from a wireless node associated with the first operator.

14. The method of claim 13, wherein the pilot tone is transmitted subsequent to a header portion of the first message and precedes a data portion of the first message.

15. The method of claim 1, further comprising:
    detecting an interfering message transmitted from a third wireless node during the CCA procedure;
    determining that the third wireless node is associated with the first operator; and
    transmitting the first message based at least in part on the determining that the third wireless node is associated with the first operator.

16. The method of claim 15, wherein the determining that the third wireless node is associated with the first operator comprises:
    decoding a header portion of the interfering message.

17. The method of claim 16, further comprising:
    identifying a failure of the decoding of the header portion of the interfering message; and
    refraining from transmitting the first message during the subframe based at least in part on the identified failure, the refraining further based at least in part on an energy level associated with the interfering message being below a threshold level.

18. The method of claim 1, further comprising:
    detecting an interfering message transmitted from a third wireless node during the CCA procedure;
    determining that the third wireless node is unassociated with the first operator; and refraining from transmitting the first message based at least in part on the determining that the third wireless node is unassociated with the first operator.

19. The method of claim 1, wherein the channel is associated with synchronized long term evolution controlled Wi-Fi (LTE-CW) communications.

20. The method of claim 1, wherein a header portion of the first message and a header portion of the second message comprise an operator identifier field associated with a public land mobile network (PLMN) operator.

21. An apparatus for wireless communication, comprising:
a processor;
memory in electronic communication with the processor; and
instructions stored in the memory, the instructions being executable by the processor to:
 determine, at a first wireless node, that a channel is busy due to a second wireless node based at least in part on a clear channel assessment (CCA) procedure performed on the channel, the first wireless node associated with a first operator;
 decode, at the first wireless node, a header of a message transmitted by the second wireless node, the header comprising an indication of the second wireless node being associated with the first operator;
 exchange radio frame configuration information with the second wireless node via a wireless wide area network (WWAN) communication channel, the radio frame configuration information comprising a timing synchronization field for time aligning a first message associated with the first wireless node and a second message transmitted from the second wireless node and a CCA configuration field for synchronizing the CCA procedure at the first wireless node with a CCA procedure at the second wireless node such that the CCA procedure at the first wireless node is in alignment with the CCA procedure at the second wireless node; and
 transmit the first message on the channel busy due to the second wireless node during a subframe based at least in part on the indication, the first message time aligned in the subframe with the second message.

22. The apparatus of claim 21, wherein the first message is unsynchronized with a third message transmitted by a third wireless node associated with a second operator that is different from the first operator.

23. The apparatus of claim 21, further comprising instructions executable by the processor to:
 modulate the first message transmitted during the subframe according to a modulation scheme.

24. The apparatus of claim 21, wherein a header portion of the first message comprises the same information as a header portion of the second message.

25. An apparatus for wireless communication, comprising:

means for determining, at a first wireless node, that a channel is busy due to a second wireless node based at least in part on a clear channel assessment (CCA) procedure performed on the channel, the first wireless node associated with a first operator;
means for decoding, at the first wireless node, a header of a message transmitted by the second wireless node, the header comprising an indication of the second wireless node being associated with the first operator;
means for exchanging radio frame configuration information with the second wireless node via a wireless wide area network (WWAN) communication channel, the radio frame configuration information comprising a timing synchronization field for time aligning a first message associated with the first wireless node and a second message transmitted from the second wireless node and a CCA configuration field for synchronizing the CCA procedure at the first wireless node with a CCA procedure at the second wireless node such that the CCA procedure at the first wireless node is in alignment with the CCA procedure at the second wireless node; and
means for transmitting the first message on the channel busy due to the second wireless node during a subframe based at least in part on the indication, the first message time aligned in the subframe with the second message.

26. A non-transitory computer-readable medium storing computer-executable code for wireless communication, the code executable by a processor to:
 determine, at a first wireless node, that a channel is busy due to a second wireless node based at least in part on a clear channel assessment (CCA) procedure performed on the channel, the first wireless node associated with a first operator;
 decode, at the first wireless node, a header of a message transmitted by the second wireless node, the header comprising an indication of the second wireless node being associated with the first operator;
 exchange radio frame configuration information with the second wireless node via a wireless wide area network (WWAN) communication channel, the radio frame configuration information comprising a timing synchronization field for time aligning a first message associated with the first wireless node and a second message transmitted from the second wireless node and a CCA configuration field for synchronizing the CCA procedure at the first wireless node with a CCA procedure at the second wireless node such that the CCA procedure at the first wireless node is in alignment with the CCA procedure at the second wireless node; and
 transmit the first message on the channel busy due to the second wireless node during a subframe based at least in part on the indication, the first message time aligned in the subframe with the second message.

* * * * *